US012601166B2

(12) United States Patent
    Blenke

(10) Patent No.:    US 12,601,166 B2
(45) **Date of Patent:      *Apr. 14, 2026**

(54) LINING TUBE FOR RECONDITIONING OF DEFECTIVE SEWER PIPES AND METHOD OF PRODUCING AND INSTALLING ONE

(71) Applicant: Brandenburger Liner GmbH & CO. KG, Landau (DE)

(72) Inventor: Stefan Blenke, Landau (DE)

(73) Assignee: Brandenburger Liner GmbH & Co. KG, Landau (DE)

( * ) Notice: Subject to any disclaimer, the term of this patent is extended or adjusted under 35 U.S.C. 154(b) by 439 days.

This patent is subject to a terminal disclaimer.

(21) Appl. No.: 18/257,650

(22) PCT Filed: Oct. 26, 2021

(86) PCT No.: PCT/EP2021/079673
§ 371 (c)(1),
(2) Date: Jun. 15, 2023

(87) PCT Pub. No.: WO2022/128218
PCT Pub. Date: Jun. 23, 2022

(65) Prior Publication Data
US 2024/0117620 A1      Apr. 11, 2024

(30) Foreign Application Priority Data
Dec. 18, 2020    (DE) .................... 10 2020 134 200.4

(51) Int. Cl.
*E03F 3/06*       (2006.01)
*F16L 11/04*      (2006.01)
*F16L 55/165*     (2006.01)

(52) U.S. Cl.
CPC .......... *E03F 3/06* (2013.01); *E03F 2003/065* (2013.01); *F16L 11/042* (2013.01); *F16L 55/1654* (2013.01); *F16L 55/1655* (2013.01)

(58) Field of Classification Search
CPC ... E03F 3/06; E03F 2003/065; F16L 55/1655; F16L 55/1654; F16L 11/042
See application file for complete search history.

(56) References Cited

U.S. PATENT DOCUMENTS 5,186,987 A  *  2/1993  Imoto ........................ B32B 5/26
                                                    264/269
5,334,429 A  *  8/1994  Imoto .................... B29C 63/34
                                                    428/36.2
(Continued)

FOREIGN PATENT DOCUMENTS

| EP | 0787940 A1 | 8/1997 |
|---|---|---|
| WO | 9504646 A1 | 2/1995 |
| WO | 2012159702 A1 | 11/2012 |

*Primary Examiner* — William M Mccalister
(74) *Attorney, Agent, or Firm* — Laurence A. Greenberg; Werner H. Stemer; Ralph E. Locher

(57) ABSTRACT

A lining tube for reconditioning a defective sewer pipe has an inner film tube, around which is disposed a radially expandable layer of fiber material that is impregnated with a curable reactive resin. The inner film tube has a connecting section that extends in longitudinal direction thereof and connects two circumferential portions of the inner film tube that run parallel to one another to give an inner film tube which is continuous over its circumference and has a defined nominal diameter. The connecting section has an intended fracture site that extends along the inner film tube and can be parted by introducing a pressure medium into the inner film tube in circumferential direction, in order to expand the inner film tube and the layer of fiber material disposed thereon radially beyond the nominal diameter. There is also described a method of producing and of installing such a lining tube.

19 Claims, 5 Drawing Sheets

(56)                 References Cited

U.S. PATENT DOCUMENTS

| | | | | | |
|---|---|---|---|---|---|
| 5,698,056 | A * | 12/1997 | Kamiyama | ............. | B29C 66/43 |
| | | | | | 156/218 |
| 5,798,013 | A * | 8/1998 | Brandenburger | ... | F16L 58/1009 |
| | | | | | 156/190 |
| 6,296,729 | B1 * | 10/2001 | Kamiyama | ........ | B29C 65/4815 |
| | | | | | 156/218 |
| 6,612,340 | B1 * | 9/2003 | Lause | ................ | F16L 55/1656 |
| | | | | | 138/97 |
| 6,679,966 | B1 * | 1/2004 | Brandenburger | ... | F16L 55/1656 |
| | | | | | 156/190 |
| 6,708,729 | B1 * | 3/2004 | Smith | ................ | F16L 55/1656 |
| | | | | | 264/269 |
| 7,857,932 | B1 * | 12/2010 | Driver | ................ | F16L 55/1656 |
| | | | | | 156/203 |
| 9,334,998 | B2 * | 5/2016 | Duttenhoefer | ...... | F16L 55/1656 |
| 9,709,206 | B2 * | 7/2017 | Duttenhoefer | ........... | B32B 3/18 |
| 2004/0156682 | A1 * | 8/2004 | Blackmore | .......... | F16L 55/265 |
| | | | | | 405/184.2 |
| 2004/0157022 | A1 * | 8/2004 | Bilgram | ................. | B29C 65/00 |
| | | | | | 428/36.9 |

| | | | | | |
|---|---|---|---|---|---|
| 2006/0130923 | A1 * | 6/2006 | Lepola | .................... | F16L 55/44 |
| | | | | | 138/93 |
| 2006/0151042 | A1 | 7/2006 | Stringfellow et al. | | |
| 2006/0278290 | A1 * | 12/2006 | Warren | ............... | F16L 55/1654 |
| | | | | | 138/137 |
| 2009/0194183 | A1 * | 8/2009 | Kiest, Jr. | ............. | F16L 55/1651 |
| | | | | | 264/269 |
| 2009/0283212 | A1 * | 11/2009 | Kubel | ................. | F16L 55/1654 |
| | | | | | 156/293 |
| 2010/0012214 | A1 * | 1/2010 | Kamiyama | ......... | F16L 55/1656 |
| | | | | | 405/184.2 |
| 2010/0078118 | A1 * | 4/2010 | Ehsani | .................... | B29C 73/10 |
| | | | | | 156/94 |
| 2013/0291987 | A1 * | 11/2013 | Brandenburger | ......... | B32B 3/08 |
| | | | | | 138/97 |
| 2014/0076448 | A1 * | 3/2014 | Duttenhoefer | ........ | F16L 55/165 |
| | | | | | 138/98 |
| 2016/0305579 | A1 | 10/2016 | Graham | | |
| 2017/0326784 | A1 * | 11/2017 | Sanders | ............. | F16L 55/1654 |
| 2017/0343147 | A1 * | 11/2017 | Meier | ................. | F16L 55/1654 |
| 2018/0003331 | A1 * | 1/2018 | Morissette | ............. | B32B 27/40 |
| 2019/0118460 | A1 * | 4/2019 | Wind | .................. | B29C 35/0805 |
| 2022/0371261 | A1 * | 11/2022 | Ehsani | .................... | F16L 11/24 |

* cited by examiner

LINING TUBE FOR RECONDITIONING OF DEFECTIVE SEWER PIPES AND METHOD OF PRODUCING AND INSTALLING ONE

FIELD AND BACKGROUND OF THE INVENTION

The invention relates to a lining tube for reconditioning defective sewer pipes and to a method of producing and installing such a lining tube which comprises an inner film tube and a radially expandable layer of fiber material which is arranged around the tube and which has been impregnated with a curable reaction resin.

In the area of trenchless reconditioning of defective pipe conduits, e.g. defective sewers, increasing use is being made of lining tubes which have one or more plies of a glass fiber laminate which is impregnated with a liquid reaction resin and is arranged in the form of overlappingly wound or laid fiber tapes around an inner film tube. On the outside, the laminate is surrounded by an outer film tube, which prevents the escape of harmful substances, in particular styrene, from the reaction resin into the soil. The lining tubes, which are also referred to as inliners, are pulled into a sewer to be reconditioned, after being pulled in are closed at their ends by means of packers and expanded by means of compressed air and cured by means of light from a source of UV radiation or, alternatively, by introducing superheated steam.

A previously mentioned lining tube and a method of producing one are known from WO-A 95/04646, for example.

In order to obtain the best possible contact between the lining tubes and the inner walls of the sewer when said tubes are expanded, this contact being the basic prerequisite for a high maximum mechanical load bearing capacity, these tubes are generally manufactured with an outside diameter which is 5 to 10% smaller than the inside diameter DN of the sewer pipe to be reconditioned. Owing to the additional stretching of the lining tube during expansion, this slight undersize leads to an improved surface finish of the cured laminate and makes it possible to compensate for slight changes in the diameter of a sewer pipe. On the other hand, in the case of the known lining tubes in the prior art, such as those in WO-A 95/04646, a stretching capacity of more than 10% is impossible since this would entail the risk that the sensitive transparent inner film would be overstretched and damaged, with the result that the compressed air introduced during expansion would escape into the laminate through the damaged inner film and eject the liquid reaction resin at the corresponding location. After the curing of the reaction resin, this generally leads to a mechanical weakpoint and lack of leaktightness, which can be detected and eliminated only at great expense, if at all.

On the other hand, however, it is likewise not possible in practice to manufacture the above-described lining tubes with a diameter which is larger than the inside diameter of the sewer pipe to be reconditioned since, in this case, the laminate and the outer film tube form folds, which are not wanted in the reconditioned sewer and which, during curing by means of UV light, lead to shadow formation that prevents complete through-curing of the reaction resin in the case of relatively large wall thicknesses.

For the abovementioned reasons, more than 40 different basic types of lining tubes with respective nominal diameters DN and a respective specially produced inner film tube are required when reconditioning pipe conduits with a diameter DN of between 150 mm and 1000 mm in order, for each sewer diameter, to provide an optimally adapted lining tube which, after being pulled in, expanded and cured, guarantees a maximum mechanical strength and leaktightness. It is self-evident that stocking a corresponding number of, generally seamless, inner film tubes and, based on this, the separate manufacture of the laminate with a corresponding diameter, represents a great logistical effort which makes the production of the lining tubes expensive.

Another inadequacy of the known lining tubes can be considered to be the fact that sewer pipes in which the inside diameter changes abruptly within a "reach", from DN 300 to DN 400 for example, can only be lined subject to high degrees of uncertainty or at great expense by pulling in and connecting two separate lining tubes of corresponding diameter when using the known lining tubes described above.

SUMMARY OF THE INVENTION

Accordingly, it is an object of the present invention to provide a lining tube which makes it possible to recondition sewer pipes with different inside diameters or with inside diameters which vary over the length of the sewer pipe, using one and the same lining tube.

According to the invention, this object is achieved by means of a lining tube as claimed.

It is a further object of the invention to provide a method by means of which a lining tube of this kind can be manufactured.

According to the invention, this object is achieved by means of a method as claimed.

Yet another further object of the invention is to provide a method by means of which a lining tube of this kind can be installed in a defective sewer pipe.

According to the invention, this object is achieved by means of a method as further claimed.

Further features of the invention are described in the dependent claims.

According to the concept underlying the invention, a cylindrical lining tube of circular cross section is configured in such a way that, as it expands, it can adapt to the different diameters of a sewer pipe. This makes it possible to manufacture the lining tube of the kind described in WO-A 95/04646 as an endless tube and to transport it to the construction site.

For this purpose, the lining tube comprises an inner film tube, on which is arranged at least one ply of a helically wound or else, alternatively, circumferentially laid fiber tape, in particular a glass fiber tape or glass fiber nonwoven, which is impregnated with a liquid reaction resin that can be cured by UV light. This is preferably followed by a glass fiber tape (longitudinal tension tape) oriented in the longitudinal direction, which bears the tensile forces during the installation of the lining tube, also referred to below as a "liner", in the sewer pipe.

Arranged around the circumferentially closed layer formed by the resin-impregnated fiber tape there is preferably an outer film tube, which can have a nonwoven ply that faces the layer of fiber material and is laminated onto a plastic film used to form the outer film tube. Arranged around the outer film tube, which is preferably manufactured from a multi-ply film with a styrene barrier, in particular a PE-PA-PE film, onto the inner PE ply of which the nonwoven layer is laminated by means of a melting process, there is preferably a tear-resistant, preferably fabric-reinforced, protective film which has a structure and material properties like those of a tarpaulin for a truck or a tear-resistant packaging film, and the longitudinal edges of which are connected along the length of the lining tube, e.g. by adhesive tape or a welded-on or adhesively bonded-on elastic film section. This elastic film section, which can also be formed by a strip of adhesive tape of appropriate width, is parted in the manner of a predetermined breaking point as the lining tube expands and thereby allows radial stretching of the otherwise tear-resistant and virtually unstretchable outer protective tube to the respective inside diameter of the sewer pipe. However, the predetermined breaking point can also be introduced in some other form, e.g. as a perforation, into the protective tube, which is formed in an overlapping manner from one, two or more film webs by adhesively bonding or welding at the edges and is also referred to below as the further outer film tube.

The lining tube is distinguished by the fact that the inner film tube has a connecting section which extends in the longitudinal direction thereof and connects two mutually parallel circumferential portions of the inner film tube to give a circumferentially closed inner film tube which has a defined nominal diameter DN that is smaller, in particular at least 10% smaller, than the inside diameter of the sewer pipe to be reconditioned. In the case of sewer pipes which have pipe sections of different diameters, the nominal diameter preferably corresponds to the diameter of the first, smaller pipe section. According to the invention, the connecting section has a predetermined breaking point which extends along the inner film tube and can be parted in the circumferential direction by introducing a pressure medium, in particular compressed air, thus enabling the inner film tube and the layer of fiber material arranged thereon to expand radially beyond the nominal diameter of the unopened inner film tube by more than 10%, preferably more than 30%, up to the diameter of the sewer pipe. This results in the advantage that the circumferentially closed inner film tube with the unopened predetermined breaking point can serve during the production of the lining tube on a winding machine as a base tube around which the fiber tapes can be wound and which has a well-defined nominal diameter DN and protects the winding tongue or the winding dome of the winding machine from direct contact with the resin-impregnated fiber material.

In the case of sewer pipes which have a first pipe section having a smaller diameter and an adjoining second pipe section with an enlarged diameter, the defined nominal diameter of the unopened inner film tube corresponds substantially to the inside diameter of the first pipe section, and the diameter of the inner film tube with the predetermined breaking point opened corresponds to the inside diameter of the second, enlarged pipe section.

This inner film tube, which allows greater laminate stretching, is therefore the first layer, around which the layer of fiber material is endlessly wound in a known manner via an internal winding dome in the preferred embodiment. Thus, the lining tube is manufactured, packaged and delivered to the construction site in a conventional manner.

In contrast to a known wound lining tube used to recondition sewers and pipe conduits of substantially constant diameter, the lining tube according to the invention, in accordance with a preferred embodiment, is distinguished by the fact that the layer of fiber material arranged in the form of a tube around the inner film tube is formed from an overlappingly wound fiber tape which allows significantly greater longitudinal stretch than fiber tapes which are used in conventional lining tubes. This increased longitudinal stretch, which, when considered in the longitudinal direction, can be at least 10%, but preferably more than 30%, or even 50%, relative to the length of the unstretched fiber tape, makes it possible for the glass fiber tapes of the wound fiber ply to stretch to a greater extent in the radial direction, thus enabling the layer of fiber material to expand its diameter in the radial direction to the respective diameter of the second pipe section in order to come to rest against the inner wall of the enlarged pipe section.

The production of such a glass fiber tape with a high longitudinal stretch is known in the prior art. During winding or laying of the resin-impregnated fiber tapes of the lining tube according to the invention, account is accordingly taken of the fact that, owing to the high radial stretch, the wall thickness of the laminate is correspondingly reduced, and therefore the material thickness of the fiber tapes wound helically one on top of the other is increased by a corresponding amount in order to produce the layer of fiber material with a corresponding oversize that ensures the required strength in the finished product after expansion and curing.

The high stretching capacity of the fiber tape or tapes used in the layer of fiber material is furthermore also of advantage in the case of lining tubes according to the invention in which the layer of fiber material is not wound but is laid in an overlapping manner as a mat around the inner film tube with the predetermined breaking point formed thereon.

As has furthermore been recognized by the applicant, it is necessary, when an outer film tube is used, that said outer film tube should stretch to a correspondingly greater extent radially than in the case of a conventional lining tube. This can be achieved either by means of films which are generally more capable of stretching or by means of a predetermined expansion joint of the kind described, for example, in German Patent Application (DE 10 2011 103 001 A1). As an alternative, it is possible for the outer film tube, which, after the winding/laying of the fiber tapes and application of the longitudinal tension tape, is welded into a tube from two flat films, to be welded so as to be generally somewhat wider, i.e. with a larger diameter which exceeds the diameter of the first pipe section of small inside diameter. For this purpose, the width of the flat film from which this tube is thermally welded can be selected in such a way, for example, that, in sum, its flat width corresponds to the diameter of the second pipe section of enlarged inside diameter. To enable this outer film tube welded with an additional oversize of, for example, 50% to be handled easily during transportation to the construction site and when being pulled into a sewer pipe, the flat films are preferably folded longitudinally and fixed releasably to one another by means of adhesive tape.

To ensure that the tubular inner film of the inner film tube around which the fiber material (laminate) is wound or laid remains airtight during the entire expansion process, in which the inner film tube and the layer of fiber material arranged thereon are expanded to the desired diameter in the sewer pipe by means of introduced compressed air, and also during the subsequent curing with UV light, a further (second) inner film tube is arranged in the interior of the inner film tube in an advantageous embodiment of the invention. This can be pulled into the first inner film tube right from the outset, during the production of the lining tube for example, if said inner film tube is produced on a winding dome of the kind described in the abovementioned WO-A 95/04646.

The lining tube with the inserted or pulled-in further (second), airtight inner film tube, the diameter of which corresponds at least to the inside diameter of the sewer pipe enlarged by more than 10% relative to the defined nominal diameter, or that of the second pipe section, is pulled in a known manner into a sewer pipe to be reconditioned and is closed at its ends by respective packers. The lining tube closed by the packers is then expanded by introducing a compressed gas, in particular compressed air, wherein the adhesive bond/weld seam (predetermined breaking point) of the (first) inner film tube tears open when the pressure is increased further, with the result that from then on the (first) inner film tube no longer presents any resistance to further expansion. This makes it possible for the layer of fiber material, which has a diameter that corresponds substantially to the diameter of the (first) unopened inner film tube or, in the case of sewer pipes with two pipe sections, to the diameter of the first, smaller pipe section, to expand further radially.

Since the diameter of the further (second) inner film tube is equal to or preferably somewhat greater than the diameter of the defective sewer pipe or of the second, enlarged pipe section, the further (second) inner film tube does not undergo any stretching in the sewer pipe, and therefore, after the bursting open of the predetermined breaking point of the (first) inner film tube, this further (second) inner film tube can come to rest without stress against the inner wall of the layer of fiber material. This advantageously ensures that the further (second) inner film tube remains airtight overall and that, despite the opened predetermined breaking point in the (first) inner film tube, no compressed air can escape through the ply of resin-impregnated fiber material, which would lead to ejection of reaction resin.

After this, the liquid reaction resin curable by UV light in the fiber tapes is cured with the aid of a UV source of radiation which radiates its light through the further (second) inner film tube, which is transparent to UV light, and the first inner film tube, which has burst open at the predetermined breaking point and is likewise transparent to UV light, onto the layer of fiber material while it is being pulled in a known manner through the interior of the further (second) inner film tube.

As was found by the applicant, the folds produced by the further inner film tube in the first pipe section did not impair the complete curing of the reaction resin, even in the case of relatively large wall thicknesses of, for example, 15 mm, since the quality of the inner surface of the reconditioned sewer pipe in the first, smaller pipe section is formed by the substantially level outside of the inner film tube, which is unopened in this pipe section. In the case of the abovementioned sewer pipes with a diameter jump, the formation of folds in the second, enlarged pipe section is likewise negligible since there the majority of the inner surface of the fiber material is covered with the level material of the (first) inner film tube, and in the part of the circumference in which the further (second) inner film tube rests directly against the laminate, only a few folds and distortions of the film material of the further (second) inner film tube are still present owing to the enlarged diameter of the second pipe section.

The invention is described below by means of preferred embodiments with reference to the drawings, using the example of a sewer pipe with two diameter sections.

DETAILED DESCRIPTION OF THE INVENTION

Figure 1:
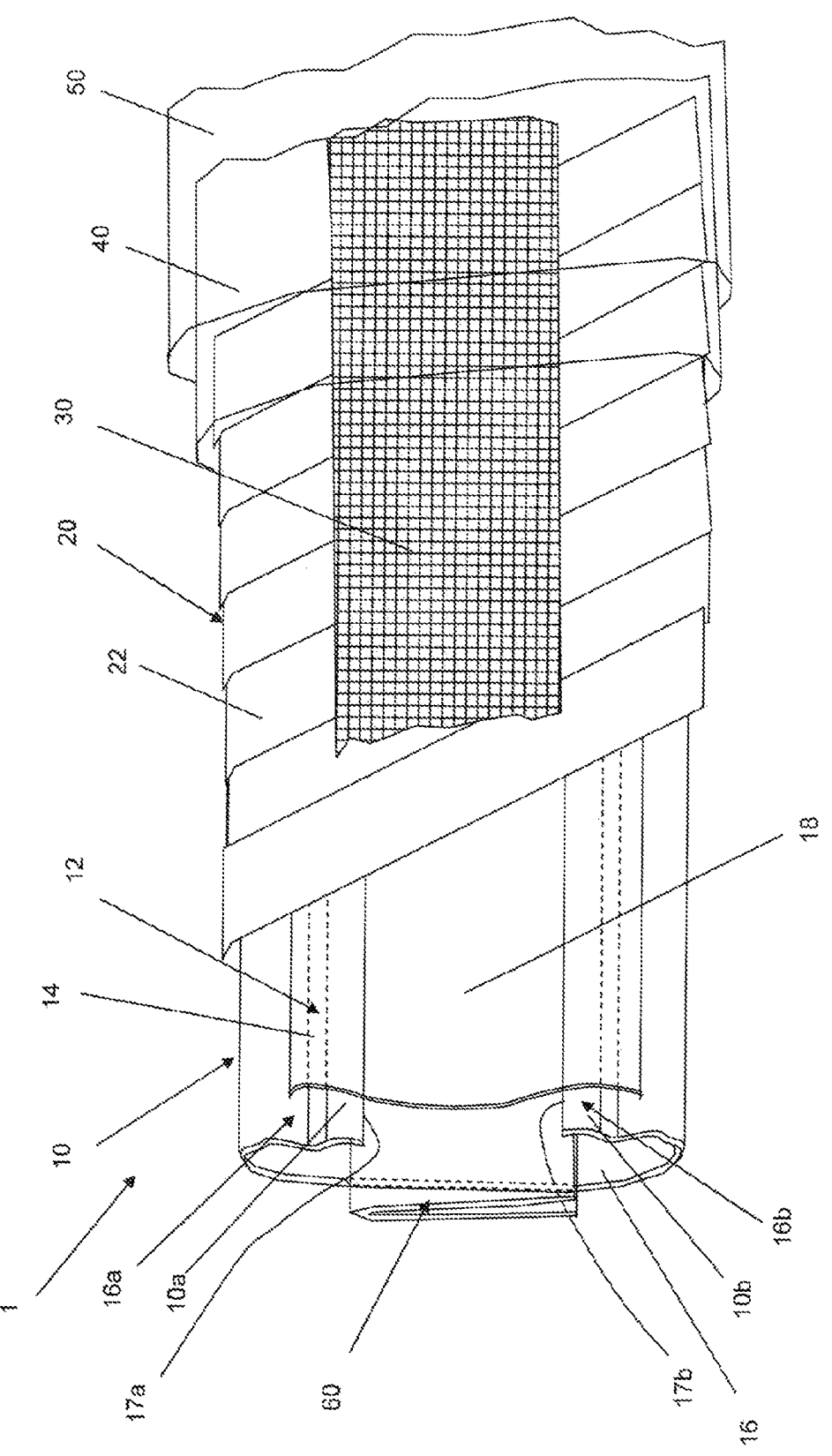
FIG. 1 shows a schematic partially transparent plan view of a lining tube according to the invention.
Figure 5:
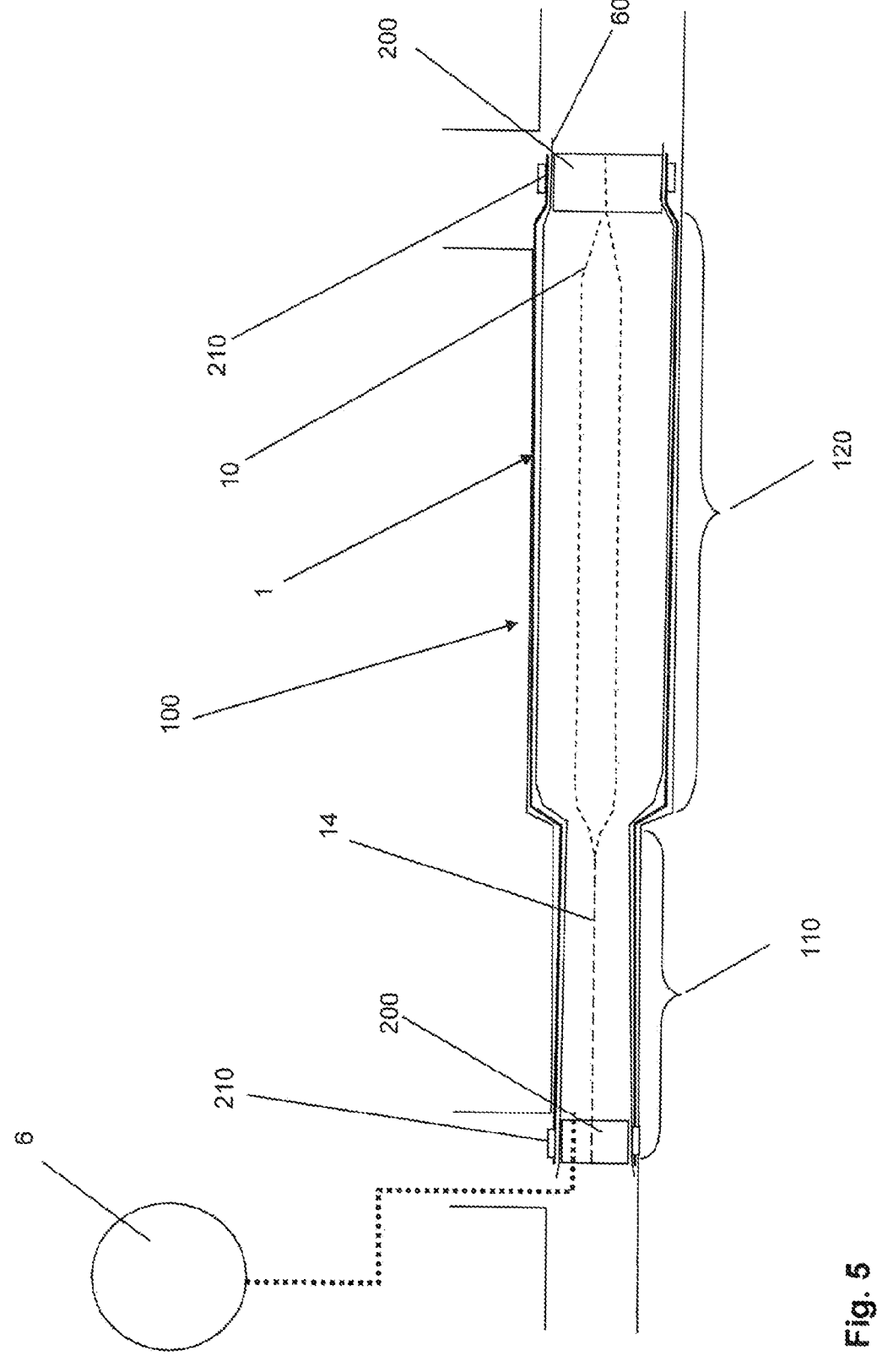
FIG. 5 shows a schematic illustration of a defective sewer pipe having a first pipe section with a smaller diameter and a second pipe section with an enlarged diameter, into which a lining tube according to the invention with a further (second), expanded inner film tube is pulled.

As shown in the illustration of FIG. 1, a lining tube 1 for the reconditioning of a defective sewer pipe 100 shown in FIG. 5, which has a first pipe section 110 with a first diameter and an adjoining second pipe section 120 with an enlarged diameter, comprises an inner film tube 10 as well as a radially expandable layer of fiber material 20, which is arranged around the latter and is impregnated with a curable reaction resin.

The lining tube 1 is distinguished by the fact that the inner film tube 10 has a connecting section 12 which extends in the longitudinal direction thereof and which, as indicated in FIG. 1, connects two mutually parallel circumferential portions 10a, 10b of the inner film tube 10 to form a circumferentially closed inner film tube which has a defined nominal diameter DN. The connecting section 12 comprises a predetermined breaking point 14 which extends along the inner film tube 10 and can be parted in the circumferential direction by introducing a pressure medium, in particular compressed air, from a compressed gas source 6 (FIG. 5), into the inner film tube 10, with the result that the inner film tube 10 and the layer of fiber material 20 arranged thereon can be expanded radially beyond the nominal diameter, which corresponds substantially to the diameter of the first pipe section 110, by more than 10%, preferably more than 30% and particularly preferably up to 50%, up to the enlarged diameter of the second pipe section 120.

In the case of a conventional sewer pipe 100, it is thus possible in practice for the diameter of the first pipe section 110 to be, for example, 600 mm, and for the diameter of the second pipe section 120 to be, for example, 800 mm, wherein a step change or a conical transition section may be formed between the first and second pipe sections 110, 120, in which the diameter of the sewer pipe 100 increases abruptly, as shown in FIG. 5, or continuously (not shown). The excess pressure at which the predetermined breaking point 14 opens can be 0.15 bar, for example, and is preferably set in such a way, by an appropriate choice of adhesive or of the width of the connecting section 12, that the predetermined breaking point always opens reliably in the expanded lining tube 1 in the second pipe section 120 at the air pressures normally used.

In the preferred embodiment of the invention, to form the inner film tube 10, at least one transparent flat film 16 is used, which is formed into a tube, for example by laying, the longitudinal edges 17a, 17b of which, as shown in FIG. 1, run at a distance from one another and are connected to one another by a transparent film strip 18 adhesively bonded or thermally welded to the outside. In this embodiment, shown in FIG. 1, which is very inexpensive to manufacture, the predetermined breaking point 14 extends along one or both longitudinal weld seam or seams or adhesive bonding locations, along which the transparent film strip 18 is connected to the corresponding circumferential portions 10a, 10b of the likewise transparent flat film 16 from which the inner film tube 10 is formed.

Figure 3:
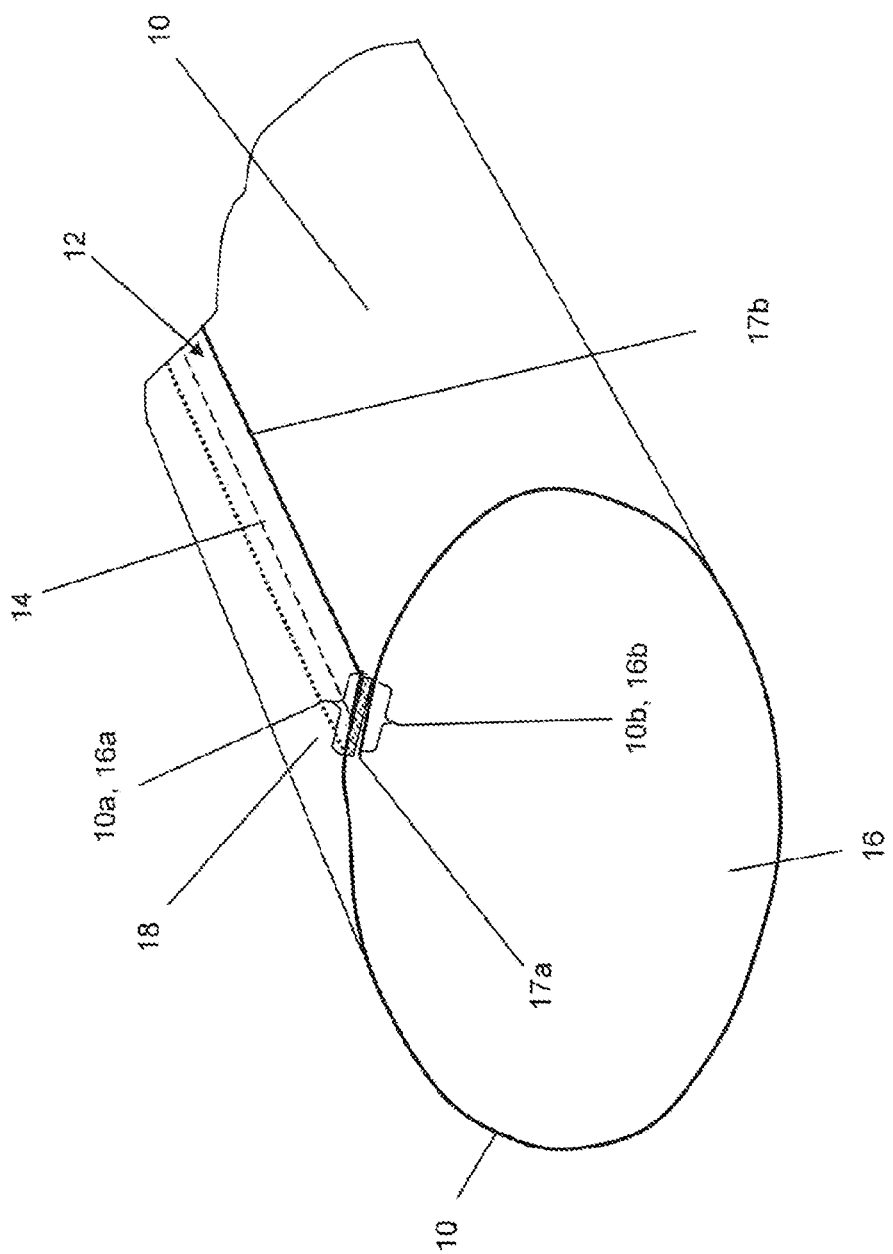
FIG. 3 shows a schematic partial illustration of a preferred embodiment of an inner film tube inserted in the lining tubes according to the invention and having a predetermined breaking point.

In a further embodiment of the invention, shown in FIG. 3, which is particularly inexpensive and simple to manufacture, the inner film tube 10 comprises at least one flat film 16 formed into a tube, the edge portions 16a, 16b of which are guided one over the other so as to overlap and are connected to one another, e.g. by an adhesive (indicated only schematically in FIG. 3), e.g. a double-sided adhesive tape, or by thermal welding. Alternatively, the edge portions 16a and 16b can also be connected to one another by a transparent adhesive tape.

The above-described two embodiments of the inner film tube according to the invention offer the advantage that a further, circumferentially closed, preferably seamless, inner film tube 60 can be inserted therein, as indicated in FIG. 1. The further inner film tube 60 is provided, in particular, as a low-cost continuous rolled product which is folded one or more times in the longitudinal direction, e.g. as a seamless film of polyethylene which is folded one or more times in the longitudinal direction and which is inserted into the inner film tube 10 before the two circumferential portions 10a, 10b are adhesively bonded or welded to one another. In this embodiment, the resin-impregnated fiber tapes 22 of the layer of fiber material 20 are laid in a particularly advantageous way around the adhesively bonded/welded inner film tube 10 in an overlapping manner. In this case, the fiber tapes are designed as individual mats, which have a length which corresponds to the length of the lining tube 1 to be produced. In this embodiment, the width of the mats is slightly, for example 10%, larger than the inner circumference of the second, enlarged pipe section 120, thereby ensuring that the layer of fiber material can expand to the second larger diameter by circumferential displacement of the overlapping longitudinal edges of the mat while, however, always remaining completely closed circumferentially when the layer of fiber material 20 has come to rest against the second pipe section 120 of larger diameter.

Figure 2:
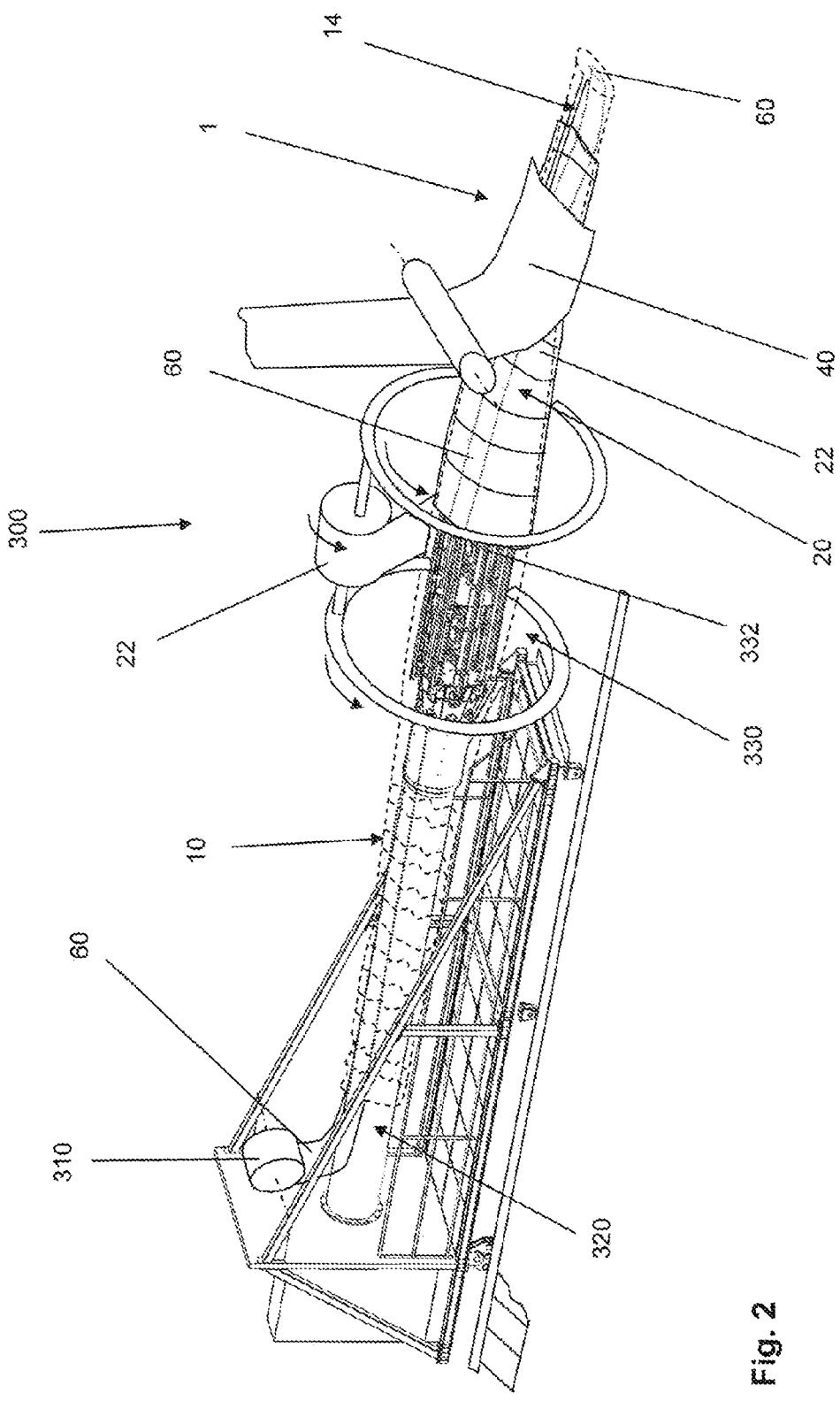
FIG. 2 shows a schematic illustration of a preferred embodiment of a winding device with a lining tube according to the invention, into the inner film tube of which a further inner film tube is pulled during the winding process.

Alternatively, it is possible to insert the further inner film tube 60, which in the present application is also referred to as the second inner film tube, into the inner film tube 10 at the factory during production itself, if said tube is produced on a known winding device 300 as shown in FIG. 2. For this purpose, the further inner film tube 60 is unrolled as a single- or multiple-fold web from a stationary supply roll 310 and guided in the interior of the inner film tube 10 along the outside of the winding tube 320 of the winding device 300, onto which the inner film tube 10 has previously been laid. In the region of the winding dome 330, the further inner film tube 60 is preferably guided along between the circulating conveyor belts 332, which feed the inner film tube 10 forward when the fiber tape or tapes 22 are drawn off from a supply roll in a known manner and wound helically around the outside of the inner film tube 10, as shown in FIG. 2. An outer film tube 40, which is preferably impermeable to styrene and UV light, and optionally a further outer film tube 50 made of tear-resistant material are applied as closed further plies to the structure formed in this way, comprising the internal further inner film tube 60, the inner film tube 10 and the ply 20 of fiber tape 22, although the outer film tube is shown only in part or not shown in FIG. 2 for the sake of clarity.

In the production method for the lining tube 1 according to the invention, which has been described above with reference to FIG. 2, it is possible, as an alternative to an inner film tube shown in FIG. 1 and FIG. 3, which is obtained by adhesive bonding/welding of the longitudinal sections of a flat film 16, to use a film tube which is seamless in the circumferential direction as an inner film tube 10, which has a circular cross section with a diameter which is more than 10%, preferably more than 40%, of the nominal diameter of the first pipe section 110 and which preferably corresponds to the diameter of the second, enlarged pipe section 120 of a sewer pipe 110 to be reconditioned. In this embodiment of the invention shown in FIG. 4, the two outer circumferential portions 10a, 10b of the seamless film tube 10, which are arranged adjacent to one another, are connected in the region of the connecting section 12, forming a film loop 13 running in the circumferential direction of the inner film tube 10 and extending over the length of the inner film tube 10, preferably by means of a transparent film strip 18 which is adhesively bonded on or thermally welded on and spans and covers the film loop 13. A connecting section 12 with a predetermined breaking point 14 which, in FIG. 4, runs along the first and second circumferential portions 10a, 10b, by way of example in the region of the adhesive bonding location or weld seam, is thereby advantageously provided. The connecting section 12 is indicated schematically by the dashed lines in FIG. 4.

Figure 4:
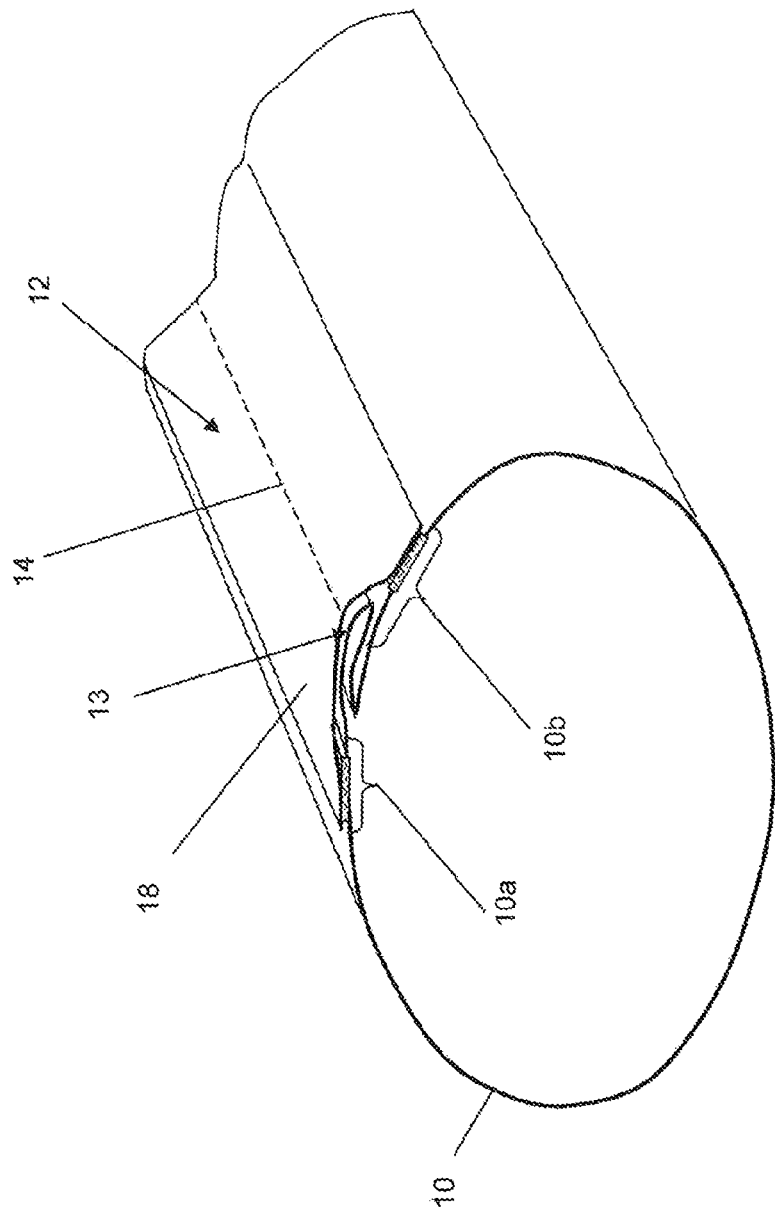
FIG. 4 shows a schematic partial illustration of a further embodiment of a seamless inner film tube inserted in the lining tubes according to the invention and having a predetermined breaking point, which comprises a film loop bridged by a film strip.

When inserting or expanding the inner film tube 10 of the embodiment of FIG. 4, it is advantageously irrelevant here whether the weld seam/adhesive bonding location which is on the right or left in the illustration tears open during expansion of the lining tube 1 in the enlarged second duct section 120 since the inner film tube 10, which is completely closed in the circumferential direction, ensures that there is an enclosed volume of air in the interior of the lining tube 1 at all times, which reliably prevents ejection of the reaction resin during expansion of said tube. In this embodiment, the further inner film tube 60 can be dispensed with in a particularly advantageous manner since airtightness is ensured at all times by the circumferentially closed inner film tube 10 laid in the manner of a loop.

A further advantage of this embodiment is that one and the same seamless inner film tube can be used for a whole range of nominal line diameters. In other words, such a seamless inner film tube having a nominal diameter DN of, for example, 600 mm can also be used to produce lining tubes which can be used to recondition sewer pipes having a nominal diameter DN of, for example, only 500 mm or 550 mm.

For this purpose, all that is necessary is to increase the length of the film loop 13 until the outside diameter of the film material of the inner film tube 10 connected at the predetermined breaking point 14 corresponds to the desired defined nominal diameter DN of the lining tube which is to be used as the basic type for the reconditioning of an entire class of sewer pipes, the diameter of which is substantially constant in each case and is, for example, in the range between 500 mm and 600 mm.

If, for example, the intention is to produce a basic type for a lining tube which can be used for reconditioning sewer pipes with a diameter of 520 mm, 530 mm, 550 mm, 580 mm and 600 mm, the length of the film loop 13 of a seamless inner film tube with a nominal diameter of 600 mm is selected in such a way that the defined nominal diameter after the adhesive bonding/welding of the two circumferential portions 10a, 10b in the connecting section 12, i.e. the production of the predetermined breaking point 14, is only 500 mm. As shown in FIG. 2, this inner film tube 10 is then helically wrapped with fiber tapes 22 and enveloped with an outer film tube 40 and, if appropriate, a further outer film tube 50. The lining tube 1 produced in this way can then be pulled into sewer pipes 100 with a substantially constant nominal diameter of 520 mm, 530 mm, 550 mm, 580 mm or even 600 mm and expanded and cured by UV light in a conventional manner. In other words, the invention also opens up the possibility of reducing the number of approximately 40 different basic types of specially manufactured seamless inner film tubes with a respective nominal diameter DN that were required hitherto for reconditioning pipe conduits with a constant diameter DN of between 150 mm and 1000 mm to a few basic types, for example 5 basic types. Moreover, a further particular temporal advantage results from the fact that, during the production of the basic type of the lining tube, the winding device 300 has to be set only once, and a single seamless inner film tube 10 has to be kept available only for each basic type.

In order to ensure a sufficiently high circumferential stretching capacity of the ply in the case of a layer of fiber material 20 which, as indicated in FIG. 2, is obtained by overlapping helical winding, the ply preferably has at least one fiber tape, in particular glass fiber tape 22, wound in a helically overlapping manner, the fiber material of which has a stretching capacity in the longitudinal direction of more than 10%, based on the total length of the tape. As has been found by the applicant, this large longitudinal stretch permits a correspondingly large radial expansion of the ply 20 produced from the fiber tape wound in a helically overlapping manner by more than 10%, in particular more than 30%, up to 60%, without significant shrinkage occurring in the longitudinal direction of the lining tube 1.

As can also be seen from the illustration in FIG. 1, in the previously described embodiments of lining tubes 1, at least one longitudinal tension tape 30, which extends in the longitudinal direction of the lining tube 1, is preferably arranged on the layer of fiber material 20. The longitudinal tension tape 30, which is not shown in FIG. 2 for technical reasons connected with illustration, preferably comprises continuous glass fibers or glass fiber rovings which preferably extend over the entire length of the lining tube 1 and which absorb the axial forces when the lining tube 1 is pulled into a defective sewer pipe 100 to be reconditioned, for example by means of a tension cable.

As already mentioned above, in the preferred embodiment of the lining tube 1, an outer film tube 40 is arranged around the layer of fiber material 20, said tube preferably having a diameter which is greater than or equal to the diameter of the further inner film tube 60, and preferably presents a barrier to the escape of harmful substances, in particular styrene, from the reaction resin into the surrounding soil. The outer film tube 40 can also be surrounded by a further outer film tube 50, a segment of which is illustrated in FIG. 1 and which consists of a reinforced tension-resistant material that is impermeable to UV light, in particular of a fabric-reinforced plastic film which is provided with a circumferentially stretchable section which, as the lining tube expands from a predetermined excess pressure, for example 0.2 bar, bursts in the sewer pipe 100 to be reconditioned with a constant larger diameter, or in the second pipe section 120, similarly to the predetermined breaking point 14 of the inner film tube 10, and permits radial stretching of the layer of fiber material 20.

The invention furthermore relates to a method for lining a defective sewer pipe 100, which will be described in more detail below with reference to the illustration in FIG. 5. The sewer pipe 100 comprises a first pipe section 110 with a first diameter and an adjoining second pipe section 120 with an enlarged diameter.

In order to recondition the defective sewer pipe 100, a previously described lining tube 1 is pulled into the defective sewer pipe 100 and the two ends of the lining tube 1 are closed with a packer 200. Following this, the lining tube 1 is expanded by introducing a pressure medium, in particular compressed air, from a compressed air source 6 into the inner film tube 10 or the further inner film tube 60 when such a tube is used. As a result, the lining tube in the first pipe section comes to rest directly against the inner wall thereof, wherein the predetermined breaking point 14 remains closed. In the second pipe section 120 with an enlarged diameter, the inner film tube 10 expands radially in the interior of the sewer pipe 100, parting the predetermined breaking point 14 in the connecting section 12, while the fiber material of the ply 20 is likewise expanded radially. In the embodiment of the inner film tube 10 shown in FIG. 4, in which a seamless inner film tube, in particular a PE-PA film, gathered by a film loop 13 is used, the seamless inner film tube 10 in this case rests directly against the fiber material of the ply 20 and thereby seals the interior of the inner film tube 10 in an airtight manner with respect to the fiber material.

In the embodiment of the inner film tube 10 shown in FIGS. 1 and 3, in which an air impermeability of 100% cannot be ensured on account of the welding or adhesive bonding process and, for this reason, a further (second) inner film tube 60 is inserted into the inner film tube 10 or is pulled in during production, the compressed gas is, in contrast, introduced into the further inner film tube 60, which is guided in a known manner over the outside of the packers 200. The lining tube is fastened airtightly on these in a known manner, e.g. by means of one or more tension straps 210 in each case, which are guided around the outside of the lining tube 1 in the region of the packers 200, before the introduction of the compressed gas into the further inner film tube 60.

In a final method step, the reaction resin in the ply 20 of fiber material is cured in a known manner by introducing a source of radiation (not shown specifically) and pulling it through the interior of the further inner film tube 60.

The above-described method can be used in an analogous manner to recondition sewer pipes 100 with a constant cross section, the diameter of which is between the defined nominal diameter of the lining tube 1 with the connecting section 12 closed, on the one hand, and the nominal diameter of the seamless inner film tube 10 with film loop 13, or the nominal diameter of the further (second) inner film tube 60, on the other hand, depending on which embodiment is used in the method according to the invention.

LIST OF REFERENCE SIGNS 1 lining tube
6 compressed gas source
10 inner film tube
10a first circumferential portion of the inner film tube
10b second circumferential portion of the inner film tube
12 connecting section
13 film loop
14 predetermined breaking point
16 flat film formed into a tube
16a edge portion
16b edge portion
17a longitudinal edge 17*b* longitudinal edge
18 film strip welded on
20 layer of fiber material
22 fiber tape
30 longitudinal tension tape
40 outer film tube
50 further outer film tube made of reinforced tension-resistant material
60 further (second) inner film tube
100 sewer pipe
110 first pipe section
120 second pipe section
200 packer
210 tension strap
300 winding device
310 supply roll for further inner film tube
320 winding tube
330 winding dome
332 conveyor belt

The invention claimed is:

1. A lining tube for restoring a defective sewer pipe, the lining tube comprising:

an inner film tube which is transparent to UV light, said inner film tube having a connecting section, which extends in a longitudinal direction thereof and connects two mutually parallel circumferential portions of said inner film tube to form a circumferentially closed inner film tube with a defined nominal diameter; and a radially expandable layer of fiber material arranged around said inner film tube, said fiber material being impregnated with a reactive resin that is curable by UV light;

said connecting section having a predetermined breaking point which extends along said inner film tube and is formed to be parted in the circumferential direction by introducing a pressure medium into said inner film tube in order to expand said inner film tube and said layer of fiber material arranged thereon radially beyond the nominal diameter.

2. The lining tube according to claim 1, wherein said inner film tube comprises at least one flat film, which is formed into a tube and which has longitudinal edges that extend at a distance from one another and are connected by a transparent film strip adhesively bonded or thermally welded onto an outer side or an inner side thereof.

3. The lining tube according to claim 1, wherein said inner film tube comprises at least one flat film, which is formed into a tube and which has edge portions connected by a transparent adhesive tape or guided one over another so as to overlap, and wherein said edge portions are connected to one another by a device selected from the group consisting of an adhesive, a transparent double-sided adhesive tape, and a thermal weld.

4. The lining tube according to claim 1, wherein said inner film tube has a circular cross section with a diameter which is more than 10% of the nominal diameter, and wherein two mutually parallel outer circumferential portions of said film tube are connected to one another in a region of the connecting section, forming a film loop running in the circumferential direction of said inner film tube and extending over a length of said inner film tube, by way of a transparent film strip which is adhesively bonded on or thermally welded on and spans said film loop.

5. The lining tube according to claim 4, wherein the diameter of said circumferentially seamless film tube is more than 40% of the nominal diameter.

6. The lining tube according to claim 1, wherein:

the layer of fiber material comprises at least one fiber tape wound in a helically overlapping manner or at least one fiber tape which extends in the longitudinal direction of the lining tube and is laid to overlap at longitudinal edges thereof;

the fiber material having a stretching capacity of more than 10%, such that the tubular layer of fiber material can be enlarged radially from a first diameter to a second diameter, with a size of the second diameter exceeding a size of the first diameter, when a pressure medium is introduced into the interior of the lining tube, by at least 10%.

7. The lining tube according to claim 6, wherein the second diameter is larger than the first diameter by more than 30%.

8. The lining tube according to claim 1, which comprises a longitudinal tension tape arranged on said layer of fiber material, said longitudinal tension tape extending in the longitudinal direction of the lining tube and containing at least one of glass fibers or glass fiber rovings running in the longitudinal direction of the lining tube for absorbing and transmitting axial forces during a drawing of the lining tube into a sewer shaft, and/or an outer film tube arranged around said layer of fiber material.

9. The lining tube according to claim 8, which comprises a further outer film tube, which is impermeable to UV light and is formed of a reinforced tension-resistant material for absorbing axial tensile forces.

10. The lining tube according to claim 9, wherein said further outer film tube is a fabric-reinforced plastic film.

11. The lining tube according to claim 1, which comprises a further inner film tube of an airtight transparent plastics material arranged inside said inner film tube, said further inner film tube extending in the longitudinal direction of the lining tube over an entire length thereof.

12. A method for producing the lining tube according to claim 1, the method comprising:

providing a transparent flat plastic film having longitudinal edges;

forming the plastic flat film into a circumferentially closed inner film tube having a predetermined nominal diameter by overlapping and adhesively bonding or welding the longitudinal edges of the plastic flat film and/or by adhesively bonding or thermally welding a transparent film strip onto two adjacent, mutually parallel outer circumferential portions of the plastic flat film arranged in the form of a tube to produce a connecting section which has a predetermined breaking point that extends in the longitudinal direction of the inner film tube; and arranging a layer of fiber material on an outside of the circumferentially closed tubular inner film tube by overlappingly helical winding or overlappingly laying at least one resin-impregnated fiber tape around the inner film tube.

13. The method according to claim 12, wherein the at least one resin-impregnated fiber tape is a glass fiber strip.

14. The method according to claim 12, which comprises laying a further transparent, circumferentially airtightly closed inner film tube, extending over the length of the lining tube, onto the plastic flat film before the plastic flat film is formed into the circumferentially closed inner film tube.

15. The method according to claim 12, which comprises pulling a circumferentially airtightly closed inner film tube into an interior of a pre-produced circumferentially airtightly closed inner film tube having a predetermined breaking point on a winding device during the helical winding step.

16. A method for lining a defective sewer pipe, the method comprising:

providing a lining tube with an inner film tube which is transparent to UV light and which has a connecting section, which extends in a longitudinal direction thereof and connects two mutually parallel circumferential portions of the inner film tube to form a circumferentially closed inner film tube with a defined nominal diameter, and a radially expandable layer of fiber material arranged around the inner film tube and being impregnated with a curable reactive resin that is curable by UV light;

wherein the connecting section has a predetermined breaking point which extends along the inner film tube and is formed to be parted in the circumferential direction;

wherein the inner film tube has a circular cross section with a diameter which is more than 10% of the nominal diameter, and wherein two mutually parallel outer circumferential portions of the film tube are connected to one another in a region of the connecting section, forming a film loop running in the circumferential direction of the inner film tube and extending over a length of the inner film tube, by way of a transparent film strip which is adhesively bonded on or thermally welded on and spans the film loop;

pulling the lining tube into the defective sewer pipe, closing two ends of the lining tube with a packer;

expanding the lining tube by introducing a pressure medium into the inner film tube in the interior of the sewer pipe, thereby parting the predetermined breaking point in the connecting section and causing the lining tube to come to rest against an inner wall of the sewer pipe; and curing the reaction resin in the ply of fiber material by introducing a radiation source into the interior of the inner film tube and irradiating the resin.

17. The method according to claim 16, wherein the expanding step comprises introducing compressed air into the inner film tube.

18. A method for lining a defective sewer pipe, the method which comprises:

providing a lining tube with an inner film tube having a connecting section, which extends in a longitudinal direction thereof and connects two mutually parallel circumferential portions of the inner film tube to form a circumferentially closed inner film tube with a defined nominal diameter, and a radially expandable layer of fiber material arranged around the inner film tube and being impregnated with a curable reactive resin;

wherein the connecting section has a predetermined breaking point which extends along the inner film tube and is formed to be parted in the circumferential direction; and wherein a further inner film tube of an airtight transparent plastics material is arranged inside said inner film tube, the further inner film tube extending in the longitudinal direction of the lining tube over an entire length thereof;

pulling the lining tube into the defective sewer pipe and closing two ends of the lining tube with a packer;

expanding the lining tube by introducing a pressure medium into the further inner film tube to radially expand the lining tube in the interior of the sewer pipe, thereby parting the predetermined breaking point in the connecting section, and causing the lining tube to come to rest against an inner wall of the sewer pipe; and curing the reaction resin in the ply of fiber material by introducing a radiation source into the interior of the inner film tube and irradiating the resin.

19. The method according to claim 18, wherein the expanding step comprises introducing compressed air into the inner film tube.

\* \* \* \* \*